United States Patent
Garner et al.

(10) Patent No.: US 10,437,304 B2
(45) Date of Patent: Oct. 8, 2019

(54) BROWN OUT CONDITION DETECTION AND DEVICE CALIBRATION

(71) Applicant: Roku, Inc., Saratoga, CA (US)

(72) Inventors: Gregory Garner, Saratoga, CA (US); Anthony Wood, Saratoga, CA (US); Simon Martin, Saratoga, CA (US); David Stern, Saratoga, CA (US)

(73) Assignee: Roku, Inc., Los Gatos, CA (US)

( * ) Notice: Subject to any disclaimer, the term of this patent is extended or adjusted under 35 U.S.C. 154(b) by 176 days.

(21) Appl. No.: 15/070,491

(22) Filed: Mar. 15, 2016

(65) Prior Publication Data

US 2017/0269664 A1    Sep. 21, 2017

(51) Int. Cl.
*G06F 1/30* (2006.01)
*G06F 1/26* (2006.01)
(Continued)

(52) U.S. Cl.
CPC ............... *G06F 1/30* (2013.01); *G06F 1/266* (2013.01); *G06F 13/385* (2013.01); *G06F 13/4282* (2013.01); *H04L 65/4084* (2013.01); *H04L 65/60* (2013.01); *H04W 52/028* (2013.01); *H04W 52/0287* (2013.01); *Y02D 10/14* (2018.01); *Y02D 10/151* (2018.01); *Y02D 70/00* (2018.01); *Y02D 70/142* (2018.01); *Y02D 70/144* (2018.01)

(58) Field of Classification Search
CPC .......... G06F 1/30; G06F 1/266; G06F 13/385; G06F 13/4282; H04L 65/60
See application file for complete search history.

(56) References Cited

U.S. PATENT DOCUMENTS 8,855,459 B2    10/2014  Millet et al.
9,131,260 B2 *   9/2015  Klarke ............... H04N 21/4221
(Continued)

FOREIGN PATENT DOCUMENTS

WO    WO-2014/138331 A2    9/2014
WO    WO 2014138331 A2 *   9/2014    ....... H04N 21/23439

OTHER PUBLICATIONS

International Search Report and Written Opinion of the International Searching Authority for International Application No. PCT/US17/22117, dated May 25, 2017 (15 pages).

*Primary Examiner* — Chris Parry
*Assistant Examiner* — Abderrahmen Chouat
(74) *Attorney, Agent, or Firm* — Sterne, Kessler, Goldstein & Fox

(57) ABSTRACT

Streaming content using a data streaming device having limited power is described. A data streaming device receives streaming content from a network and provides the streaming content for display on a content display device. Data streaming device includes power supplies that receive power from the content display device. The power supplies use the power to operate components of data streaming device that process the streaming content. A measuring module measures the power provided to the data streaming device. When the power is insufficient, a controller generates an indication that there is insufficient power to operate the components of the data streaming device. The controller may also modify functionality of the components to operate using available power or disable a component of the data streaming device.

21 Claims, 9 Drawing Sheets

(51) Int. Cl.
*G06F 13/42* (2006.01)
*G06F 13/38* (2006.01)
*H04L 29/06* (2006.01)
*H04W 52/02* (2009.01)

(56) References Cited

U.S. PATENT DOCUMENTS

| | | | |
|---|---|---|---|
| 9,693,311 B2* | 6/2017 | Cardozo | H04W 52/0258 |
| 2007/0192641 A1* | 8/2007 | Nagendra | G06F 1/3203 |
| | | | 713/320 |
| 2013/0111521 A1* | 5/2013 | Klarke | H04N 21/4221 |
| | | | 725/38 |
| 2013/0263171 A1 | 10/2013 | Calhoun et al. | |
| 2014/0113684 A1* | 4/2014 | Rofougaran | G06F 1/3203 |
| | | | 455/557 |
| 2015/0222141 A1* | 8/2015 | Yamazaki | G06F 1/26 |
| | | | 320/103 |

* cited by examiner

US 10,437,304 B2

BROWN OUT CONDITION DETECTION AND DEVICE CALIBRATION

FIELD

The field relates generally to a data streaming device, and more specifically to operating a data streaming device using limited power provided by another electronic device.

BACKGROUND

Data streaming devices may operate using power provided by other electronic devices. Because different electronic devices provide different amounts of power, a data streaming device may operate and stream content when connected to some electronic devices, but not others. When a data streaming device requires more power than an electronic device is able to provide, the data streaming device may shut down without providing a user with a warning that the data streaming device requires additional power to operate and stream content.

BRIEF SUMMARY

System, method, and a computer readable medium embodiments, and combinations and sub-combinations thereof, for streaming content from a data streaming device to a content display device using power provided by the content display device. A power supply included in the data streaming device receives power from the content display device. The power is used to operate a component of the data streaming device. A measuring module measures the amount of the received power. A controller generates an indication that the amount of the received power is insufficient to operate the component of the data streaming device. The controller also calibrates the component of the data streaming device to operate using the available amount of power. The controller also shuts down the power supply or reduces the functionality of the component, so that the data streaming device is able to operate using available amount of power.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for determining and preventing a brown out condition that may occur when a data streaming device does not receive sufficient power to operate from another electronic device or another power source. Also provided herein are system, method and/or computer program product embodiments, and/or combinations and sub-combinations thereof, for calibrating components of the data streaming device so that the data streaming device is able to operate using available power.

Figure 1:
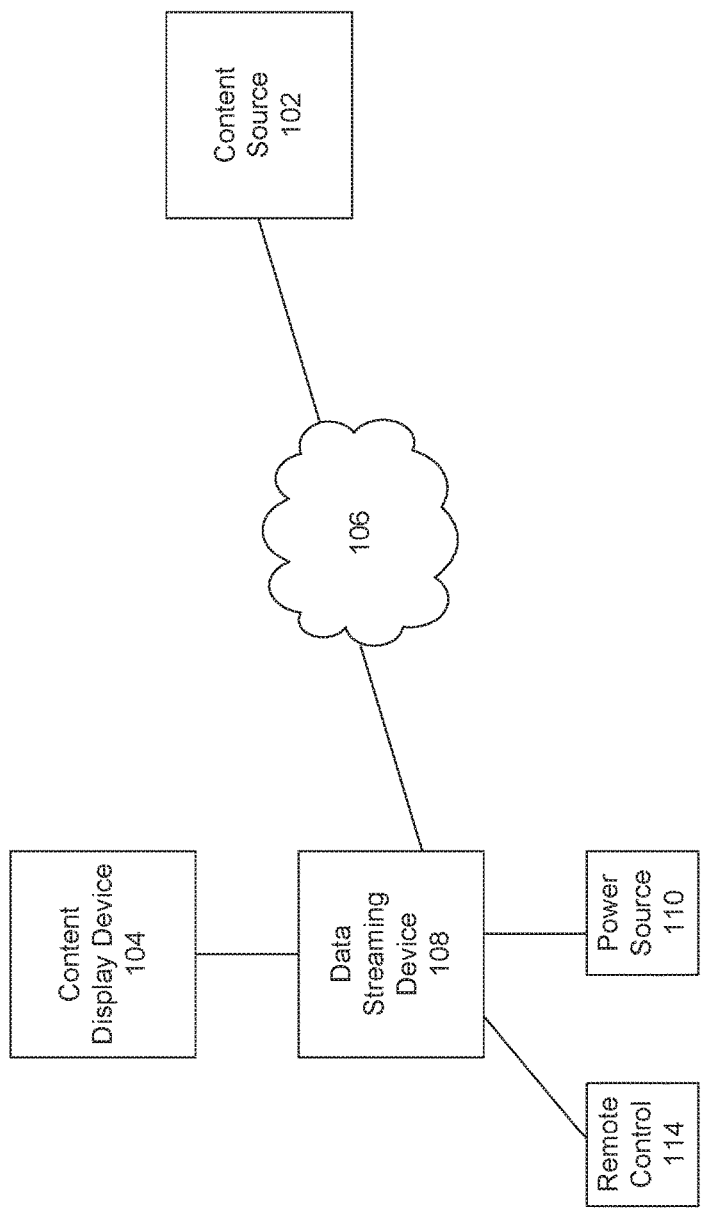
FIG. 1 is a block diagram of a system where example embodiments may be implemented.

FIG. 1 is a block diagram of a system 100 where example embodiments may be implemented. System 100 streams content, such as multi-media content, over a network. To stream content, system 100 includes multiple content sources 102 and content display devices 104. Network 106 connects content sources 102 and content display devices 104.

In an embodiment, content sources 102 generate and distribute content. To distribute content, content sources 102 are connected to network 106 directly or via one or more content servers. Together with content servers, content sources 102 store, access, process, and/or distribute content over network 106 to content display devices 104.

In an embodiment, content display devices 104 receive and display content. To display content, content display devices 104 request or are connected to devices that request content from content sources 102. In response, content sources 102 provide the requested content to content display devices 104.

In an embodiment, content display devices 104 may be portable or non-portable electronic devices, such as, desktops, a laptops, smartphones, tablets, television sets, set-top boxes, or media players to name a few non limiting examples.

In an embodiment, network 106 serves as a medium that provides content from content sources 102 to content display devices 104. Network 106 may be a wired and/or wireless network, including a network having interconnected computer networks, referred collectively as the Internet. In an embodiment, network 106 may include private, public, academic, business, and government networks that include access to extensive amounts of information and resources. Network 106 may also include cellular and/or other wired or wireless communication mediums. In an embodiment, network 106 may be a combination of local area networks (LANs) and wide area networks (WANs).

In an embodiment, different types of content may be transmitted over network 106. Content may be static content or streaming content. Static content may be transmitted at once to content display device 104 and viewed on content display device 104. Streaming content may be viewed using content display device 104 at the same time as another portion of streaming content is transmitted over the network 106. In an embodiment, the streaming content may also be stored on content display device 104 or another device and viewed at a later time.

In an embodiment, content may include media content, video content, audio/visual content, textual documents, images, games, music, software, real-time games, and other forms of media that may be transmitted over network 106.

In an embodiment, system 100 also includes a data streaming device 108. Example data streaming device 108 may be a streaming stick or a streaming player. Data streaming device 108 connects to network 106 and provides content to content display device 104, such as a television, that does not have access to network 106 and can display content display content using television compatible formats (as described below). In an embodiment, data streaming device 108 may be part of or integrated with content display device 104.

In an embodiment, data streaming device 108 may be a portable device that may be transported to different locations and be connected to different content display device 104 at different locations. Once connected to content display device 104 and network 106, data streaming device 108 is able to receive and display content over network 106 and provide content for display on content display device 104.

To display content, data streaming device 108 may be a Wi-Fi enabled device. A person skilled in the art will appreciate that Wi-Fi is a local, wireless connection to network 106. Data streaming device 108 may connect to network 106 using Wi-Fi and receive content over network 106.

Data streaming device 108 provides content to content display device 104. In an embodiment, prior to providing content to content display device 104, data streaming device 108 processes content and converts content into a format viewable on content display device 104. For example, data streaming device 108 may receive content over network 106 in compressed, non-viewable format. Data streaming device 108 may convert the received content into video and audio data format that can be presented on content display device 104.

In an embodiment, data streaming device 108 may connect to content display device 104 using a high definition multimedia interface (HDMI). The HDMI may include an HDMI cable and/or HDMI port that connect data streaming device 108 to content display device 104. The HDMI allows data streaming device 108 to provide content to content display device 104 in a viewable HDMI format, such as uncompressed video/audio format. For example, data streaming device 108 may receive content in compressed format over network 106. Data streaming device 108 may convert content into the viewable form, such as uncompressed video data, and compressed or uncompressed digital audio data that is compliant with HDMI. Data streaming device 104 may transmit the HDMI compliant content to content display device 104 over the HDMI cable/port. A person skilled in the art will appreciate that the above example utilizing HDMI is exemplary and that other cables and interfaces that transmit content between data streaming device 108 and content display device 104 may also be used.

In an embodiment, data streaming device 108 requires power to operate. To obtain power, data streaming device 108 may be connected to a power source 110. Power source 110 provides power to data streaming device 108 and enables data streaming device 108 to receive content over network 106 and provide content to content display device 104. Example power source 110 may be a battery or an electrical outlet.

In another embodiment, data streaming device 108 may also receive power from content display device 104. In an embodiment, to obtain power from content display device 104, data streaming device 108 may connect to a universal serial bus (USB) port of content display device 104 and receive power over the USB connection. A USB cable may be plugged into a USB port of content display device 104 and into a receiving port or end of data streaming device 108. Also, data streaming device 108 may be connected directly into the USB port of content display device 104. In this embodiment, content display device 104 may be connected to power source 110 and may receive power from power source 110 for both content display device 104 and data streaming device 108.

In an embodiment, content display device 104 may be a primary source of power for data streaming device 108, while power source 110 may be a secondary source of power. As such, power source 110 may provide power to data streaming device 108 when content display device 104 is unable to provide sufficient power for data streaming device 108 to operate and stream content. When content display device 104 is unable to provide sufficient power, a user may connect the power connector of data streaming device 108 to power source 110.

In an embodiment, data streaming device 108 may be wirelessly coupled to a remote control 114. Remote control 114 may provide instructions to data streaming device 108. Example instructions may turn data streaming device 108 on, indicate content or channel selection to data streaming device 108, indicate volume selection, etc. In an embodiment, remote control 114 may communicate with data streaming device 108 using network 106 (not shown) or another communication method, such as, a radio frequency interface, cellular, Bluetooth, etc.

In an embodiment, remote control 114 may have a display screen. The display screen may display messages generated by data streaming device 108, configure settings on data streaming device 108, select channels and/or volume, etc.

In an embodiment, content display devices 104 may distribute a limited amount of power to data streaming device 108. In this case, data streaming device 108 may also be connected to power source 110. In some instances, content display device 104 may initially have sufficient power to fully operate and distribute to data streaming device 108, but then run out of sufficient power as data streaming device 108 and content display device 108 begin to operate to stream and display content. In this case, data streaming device 108 may be required to reduce functionality or terminate one or more of its components to conserve power until data streaming device 108 is connected to power source 110. In another embodiment, data streaming device 108 may display a message or an indication to the user to connect data streaming device 108 to power source 110. FIGS. 2-8 provide different embodiments that enable data streaming device 108 to function using limited power distributed by content display device 104.

Figure 2:
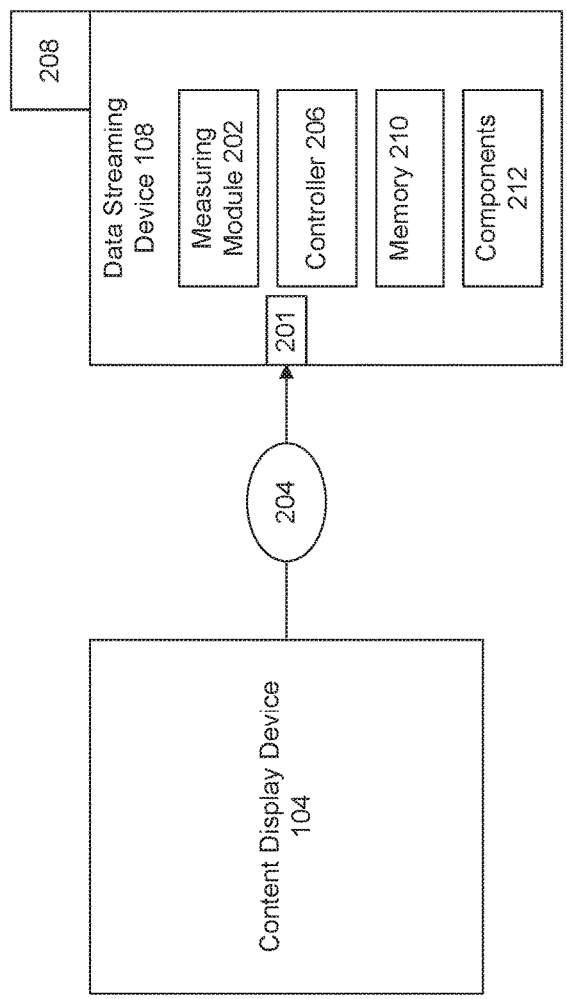
FIG. 2 is a block diagram of a data streaming device, according to an embodiment.

FIG. 2 is a block diagram 200 of a data streaming device, according to an embodiment. Data streaming device 108 in block diagram 200 streams content received over network 106 to content display device 104.

In an embodiment, data streaming device 108 includes a power receiver 201 or another interface. In an embodiment, power interface 201 can be a USB interface that receives power 204 from content display device 104. Power 204 may be power or a component of power used to calculate power (such as current or voltage), collectively referred to as power 204, that content display device 104 or another device provides to data streaming device 108.

In an embodiment, data streaming device 108 includes a measuring module 202. Measuring module 202 measures power 204 or component of power received from content display device 104. For example, content display device 104 may provide current (a component of power 204) to data streaming device 108. Measuring module 202 measures the received current and determines whether the amount of current is sufficient for data streaming device 108 to operate and stream content. One way to determine whether content display device 104 provides a sufficient amount of current is to pre-define or preconfigure a current threshold in measuring module 202, where the current threshold is the minimum amount of current that data streaming device 108 requires to stream content using a pre-set frame rate, resolution, processor clock rate, etc. Measuring module 202 may compare the current provided by content display device 104 to the current threshold. When the current provided by content display device 104 is below the current threshold, data streaming device 108 may be unable to stream content to content display device 104 (or suffer other limitations, such as having to discontinue certain functions) and require additional power from power source 110.

One embodiment of measuring module 202 may be a power grid regulator. A power grid regulator is a hardware component that has input voltage and output voltage, where the input voltage is greater than the output voltage. Both input voltage and output voltage or the ranges for the input voltage and the output voltage may be preconfigured in the power grid regulator. The power grid regulator generates output voltage from the input voltage using a current load provided by content display device 104. In this embodiment, when the power grid regulator receives a current load that results in the input voltage being too low to generate a preconfigured output voltage, power grid regulator determines that there is insufficient power to operate data streaming device 108 and stream content to content display device 104.

In an embodiment, data steaming device 108 also includes a controller 206. Controller 206 controls one or more components of data streaming device 108. Controller 206 may be the same or different hardware component as a processor that executes on data streaming device 108 and processes content (not shown). A processor is described in detail in FIG. 9. Controller 206 generates instructions to hardware and software components 212 of data streaming device 108. Example instructions cause components 212 of data streaming device 108 to connect to network 106, control Wi-Fi, set bandwidth of the connection, convert content stream received from content source 108 into format compliant with content display device 104, determine resolution and/or frame rate of content stream, control processor clock rate, etc.

In an embodiment, controller 206 also generates instructions that may decrease the amount of power required for data streaming device 108 to function. For example, controller 206 may issue instructions that disable connectivity to network 106, such as Wi-Fi, and thus reduce power consumption. In another example, controller 206 may generate instructions that reduce frame rate or resolution of the media component of content stream, and also reduce power consumption. In yet another example, controller 206 may issue instructions that reduce central processing unit (CPU) or graphics processing unit (GPU) clock speed and thus reduce power consumption of data streaming device 108. A person skilled in the art will appreciate that the above examples are non-limiting, and that controller 206 may also issue instructions to other components 212 in data streaming device 108 and reduce power consumption.

In an embodiment, controller 206 may issue instructions that warn user that data streaming device 108 requires more power than power 204 provided by content display device 104. For example, data streaming device 108 may include an LED light 208 or another light. LED light 208 comprises one or more LEDs. Controller 206 may issue instructions that activate LED light 208. LED light 208 may act as a warning to a user that data streaming device 108 does not receive enough power 204 from content display device 104, and that a user should connect data streaming device 108 to power source 110. In yet a different embodiment, LED light 208 may be lit in different colors. Each color may indicate the amount of available power on data streaming device 108. For example, a red light may indicate that controller 206 is about to shut down or disable Wi-Fi on data streaming device 108 and must be connected to power source 110. An orange light may indicate that data streaming device 108 has just enough available power to operate and should be connected to power source 110 eminently. And a green LED light 208 may indicate that data streaming device 108 has sufficient amounts of power to operate and stream content.

In a further embodiment, controller 206 may issue instructions that enable network connectivity with network 106, increase frame rate, increase resolution, and clock speed of CPU or GPU when data streaming device 108 is connected to power source 110.

In another embodiment, controller 206 may issue instructions to remote control 114. The instructions may cause remote control 114 to display a message to a user indicating to operate and should be connected to power source 110. The instructions may also cause remote control 114 to activate an LED light on remote control 114 as an indication that data streaming device 108 requires more power.

In a further embodiment, data streaming device 108 may include a memory 210. Memory 210 may be one of memories described in FIG. 9 or NAND flash memory. In an embodiment, memory 210 may store the amount of power 204 that data streaming device 108 receives from content display device 104. Controller 206 may then read memory 210 for the value of power 204 and determine whether the value is above or below the threshold power required to operate data streaming device 108. If the amount of power 204 is insufficient, data streaming device 108 may activate LED light 208 or display a message on remote control 114.

In another embodiment, data streaming device 108 may read or access data from content display device 104 that indicates the amount of power 204 that content display device 104 is able to provide to data streaming device 108. Example data may be stored in a data structure of content display device 104, such as an extended display identification data (EDID) data structure. The EDID may indicate the amount of power 204 available from content display device 104. Data streaming device 108 may read the data indicating the amount of power from EDID and store the data in memory 210. Further, when data streaming device 108 is connected to different content display devices 104, memory 210 may be supplemented with different readings of power from different content display devices 104. In this case, when data streaming device 108 is connected to content display device 104 or a model of content display device 104 that data streaming device 108 was previously connected to, controller 206 may determine the amount of power 204 from content display device 104 that content display device 104 is able to provide by reading the data in memory 210.

In yet another embodiment, controller 206 may run a boot test on data streaming device 108. The boot test may be a stress test designed to determine the amount of power required for data streaming device 108 to function and determine whether the amount of power 204 is sufficient to operate data streaming device 108. The boot test may require controller 206 to activate one or more components 212 of data streaming device 108 in sequence or in parallel, and/or maximize processing throughput of components 212. For example, controller 206 may issue instructions that enable maximum bandwidth connectivity with network 106, maximum resolution and/or frame rate for streaming content, and maximum CPU and/or GPU clock speed. As more and more components 212 are activated, components 212 draw more and more power 204 from content display device 104 in order to operate and process content. In an embodiment, controller 206 may incrementally store the amount of power 204 drawn by the activated components 212 in memory 210. In this way, if content display device 104 or data streaming device 108 shuts down during the boot test (due, for example, to insufficient power 204), data streaming device 108 does not need to restart the boot test upon power-up, but can restart the boot test using components 212 that alone or in combination consume the greatest amount of power stored in memory 210 prior to shut down.

Figure 3:
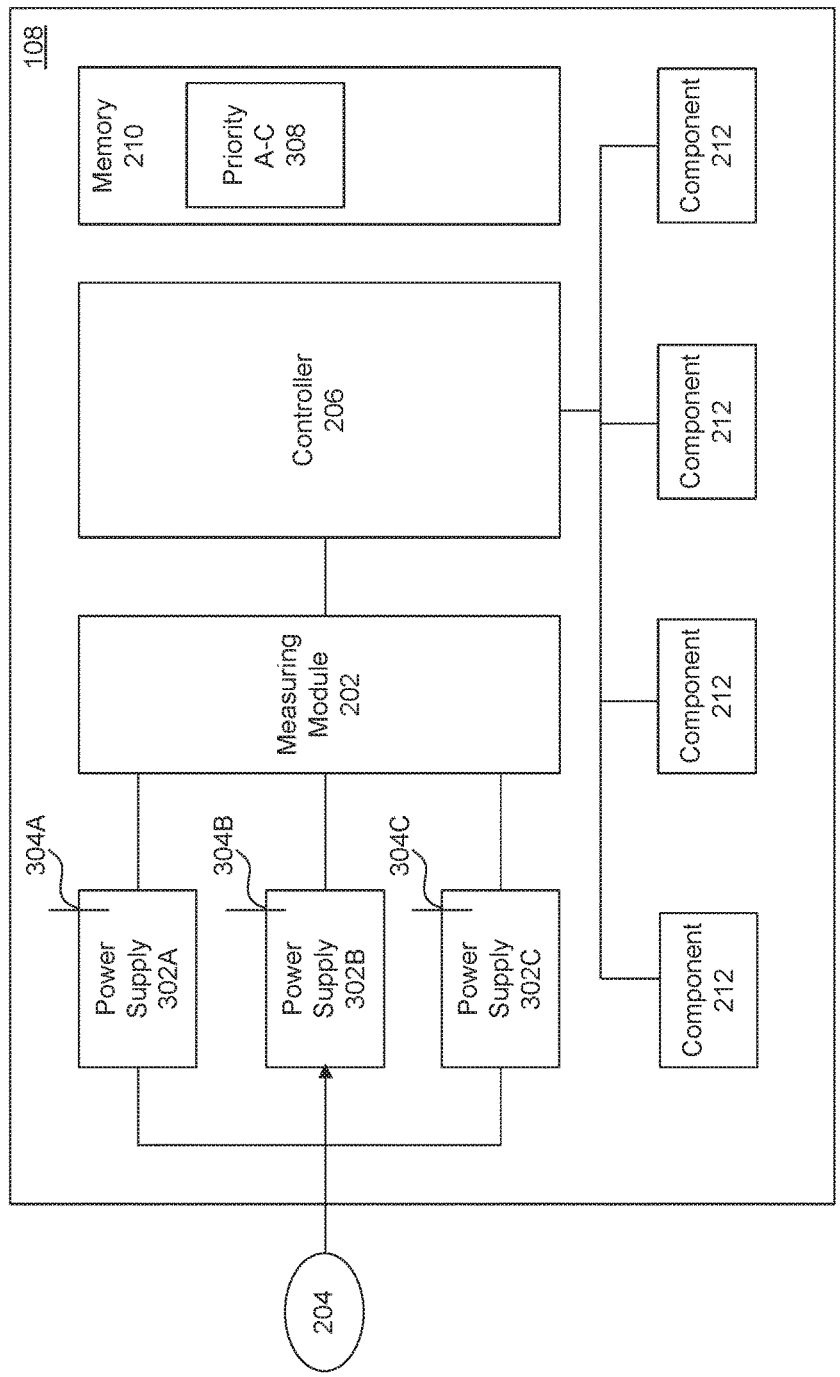
FIG. 3 is a block diagram of a data streaming device that detects a brown out condition, according to an embodiment.

FIG. 3 is a block diagram 300 of a data streaming device that prevents a brown out condition, according to an embodiment. A brown out condition is a shut-down of data streaming device 108 or a reduction of processing or functionality on data streaming device due to insufficient power. For example, data streaming device 108 may be shut-down without providing a warning to a user that data streaming device 108 is receiving insufficient power.

Data streaming device 108 in block diagram 300 may include some or all components of data streaming device in FIG. 2. Data streaming device 108 in block diagram 300 includes one or more power supplies, such as power supplies 302A, 302B, and 302C, collectively referred to as power supplies 302A-C. Power supplies 302A-C receive power 204 from content display device 104 (see FIG. 2) and provide some or all power to one or more components 212 of data streaming device 108.

In an embodiment, power supplies 302A-C may have different priorities. The priorities indicate whether data streaming device 108 may function with or without the respective power supply 302A-C and the order for controller 206 to shut down the respective power supply 302A-C. For example, if power supply 302A has a high priority and data streaming device 108 does not receive enough power 204 to power supply 302A, then data streaming device 108 shuts down. In another example, if power supplies 302C and 302B have a low priority and data streaming device 108 does not receive enough power 204, data streaming device 108 may disable one or both of power supplies 302B and 302C and continue to operate using limited power. Additionally, while operating using limited power, data streaming device 108 may generate a warning indicating that data streaming device 108 requires more power.

In an embodiment, each power supply 302A-C may have a power grid pin, such as respective power grid pins 304A-C. For example, power supply 302A may have power grid pin 304A, power supply 302B may have power grid pin 304B, and power supply 302C has power grid pin 304C. Power grid pins 304A-C measure power received by power supplies 302A-C and indicate to measuring module 202 whether respective power supplies 302A-C receives enough power to operate on data streaming device 108.

When one of power grid pins 304A-C indicates to measuring module 202 that respective power supply 302A-C do not have enough power to operate, measuring module 202 causes controller 206 to issue instructions. The instructions may either shut down data streaming device 108 or disable one or more components 212 of data streaming device 108. In an embodiment, controller 206 determines the type of instructions to issue based on priority of power supplies 302A-C. Priority of power supply 302A-C may be stored in memory 210 of data streaming device 108 as priority 308A-C. Priority 308A may be priority of power supply 302A, priority 308B may be priority of power supply 302B, and priority 308C may be priority of power supply 302C.

As discussed above, controller 206 may receive an indication that one or more power supply 302A-C are not receiving enough power because available power 204 from content display device 104 is limited on data streaming device 108. Based on the indication, controller 206 accesses priority 308A-C of a corresponding power supply 302A-C and determines whether to shut down data streaming device 108 or components 212 of data streaming device 108 based on the priorities 308A-C. For example, when controller 206 receives an indication that power supply 302A does not receive enough power, controller 206 access priority 308A in memory 210. In the above example, based on priority 308A, controller 206 determines that power supply 302A is a core power supply without which data streaming device 108 cannot operate, and shuts down data streaming device 108. In another example, when controller 206 receives an indication that power supply 302C does not receive enough power, controller 206 access priority 308C in memory 210. Based on priority 308C, controller 206 determines that power supply 302C is a secondary power supply in data streaming device 108 and disables or reduces activity of one or more components 212 of data streaming device 108. For example, controller 206 may reduce or disable network connectivity components, reduces CPU clock rate, reduce or disable content processing components which control resolution and/or frame rate of content, etc. Because controller 206 disables or reduces functionality of components 212, data streaming device 108 is able to operate using less power that is provided as power 204. In an embodiment, data streaming device 108 may operate on less power until data streaming device 108 is connected to power source 110.

Figure 4:
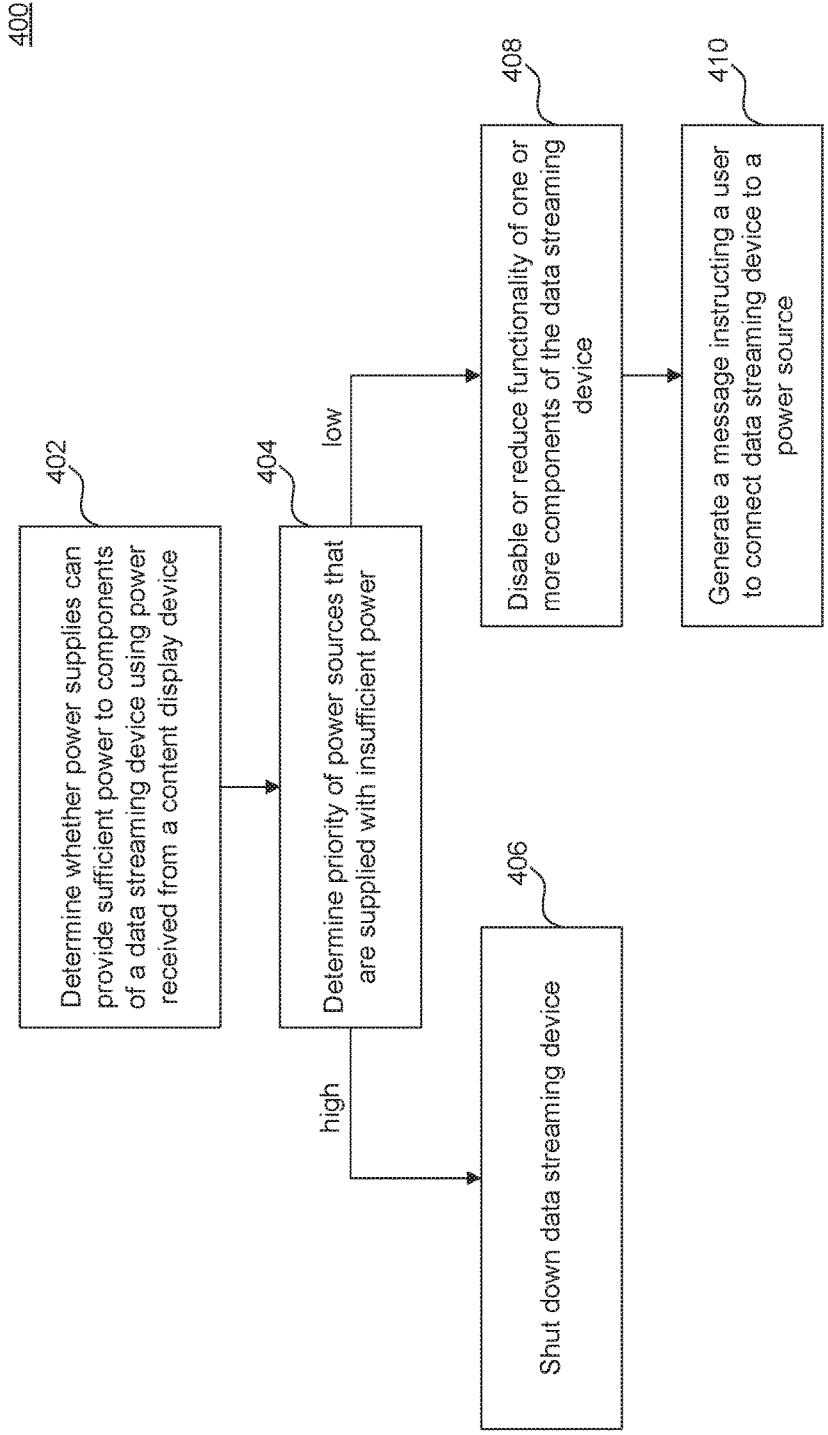
FIG. 4 is a flowchart of a method that reduces power consumption on a data streaming device and prevents a brown out condition, according to an embodiment.

FIG. 4 is a flowchart of a method 400 that reduces power consumption on a data streaming device and prevents a brown out condition, according to an embodiment. Method 400 may be implemented using processing logic that can comprise hardware (e.g., circuitry, dedicated logic, programmable logic, microcode, etc.), software (e.g., instructions run on a processing device), or a combination thereof.

At operation 402, power is received at a data streaming device. For example, data streaming device 108 receives power 204 from content display device 104. Power 204 is distributed to power supplies 302A-C. Power grid pins 304A-C detect the power supplied to power supplies 302A-C. Measuring module 202 then determines whether the power detected by power grid pins 304A-C is sufficient to operate components 212 connected to power supplies 302A-C. In another embodiment, power grid regulator may determine whether each power supply 302A-C can provide a predetermined amount of output voltage based on some or all of power 204. If sufficient amount of power is supplied to power supplies 302A-C, method 400 ends. Otherwise, method 400 proceeds to operation 404.

At operation 404, a priority of one or more power supplies is determined. For example, controller 206 determines priority 308A-C for respective power supplies 302A-C. If the priority for a given power supplies 302A-C is high, method 400 proceeds to operation 406, otherwise to operation 408. The high and low priorities described here are exemplary and there may be additional actions taken based on other priorities that are not shown in method 400.

At operation 406, data streaming device is shut down. For example, a high priority, such as priority 308A, may indicate that data streaming device 108 cannot operate without power supply 302A, which is a core power supply. As a result, because power 204 does not provide a sufficient amount of power to power supply 302A, controller 206 shuts down data streaming device 108.

At operation 408, one or more components 212 of data streaming device are disabled. For example, a low priority, such as priority 308C, may indicate that data streaming device 108 can operate without power supply 302C. In this case, controller 206 disables power supply 302C which either disables or reduces functionality of one or more components 212 until data streaming device 108 is connected to power source 110.

At operation 410, data streaming device generates a message. For example, controller 206 generates an indication to remote control 114 that instructs the user to connect data streaming device 108 to another power source, such as power source 110. In another example, controller 206 activates LED light 208 that indicates to a user to connect data streaming device 108 to power source 110.

Figure 5:
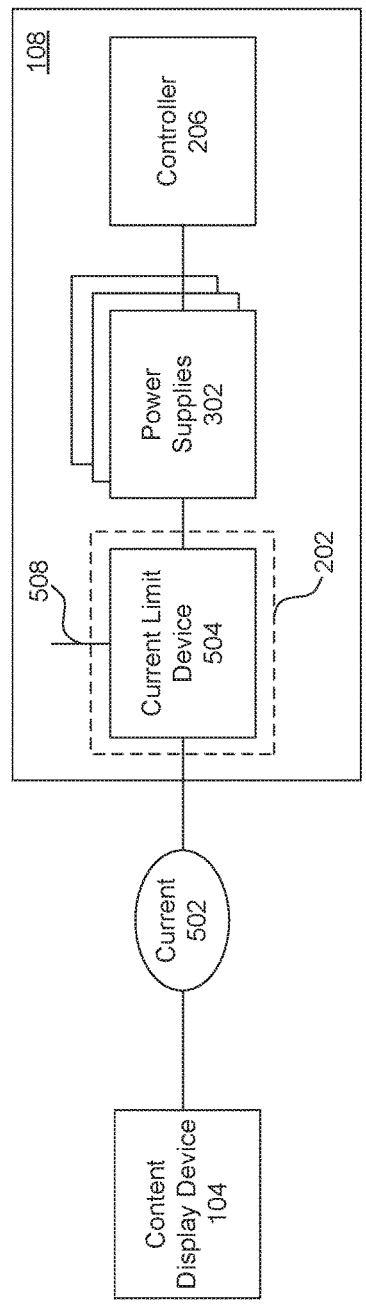
FIG. 5 is a block diagram of a data streaming device that detects whether data the streaming device receives sufficient amount of power to operate, according to an embodiment.

FIG. 5 is a block diagram 500 of a data streaming device 108 that detects whether the data streaming device 108 receives sufficient amount of power to operate, according to an embodiment. Data streaming device 108 in block diagram 500 may include some or all components of the data streaming device shown in FIGS. 2 and 3. As discussed above, data streaming device 108 requires a predefined amount of power to operate. And, as discussed above, content display device 104 may or may not provide sufficient power to operate data streaming device 108.

In an embodiment, content display device 104 provides current 502 to data streaming device 108. Data streaming device 108 uses current 502 to generate power using power supplies 302.

In an embodiment, data streaming device 108 includes current limit device 504. Current limit device 504 measures current 502 when current 502 enters data streaming device 108. In an embodiment, current limit device 504 may be a type or a component of measuring module 202.

In an embodiment, current limit device 504 may measure current 502 to determine the amount of power that is being provided by content display device 104. In a further embodiment, current limit device 504 may measure current 502 before current 502 is distributed to power supplies 302. In a further embodiment, current limit device 504 may be coupled to a capacitor (not shown) such that the capacitor stores charge corresponding to current 502 before dissipating current 502 to power supplies 302.

In an embodiment, current limit device 504 may include a current indicator pin 508. Current indicator pin 508 measures the amperage of current 502. When current limit device 504 determines that content display device 104 provides current 502 that is sufficient to generate power greater than the amount of power required to fully operate data streaming device 108, data streaming device 108 begins to operate. The determination may be based on a preconfigured current threshold that is a minimum amount of current that data streaming device 108 requires to operate. When current limit device 504 determines that content display device 104 does not provide sufficient current to power data streaming device 108, controller 206 may generate a message to remote control 114. Controller 206 may also generate a message when current limit device 504 determines that there is just enough current 502 to power data streaming device 108 because current 502 may become insufficient when data streaming device 108 begins to process content. Current limit device 504 may determine that there is just enough current 502 when current 502 is approximately at the preconfigured current threshold.

In an embodiment, the message may indicate that content display device 104 does not provide enough current 502, or provides just enough current 502 for data streaming device 108 to operate, and that to ensure further and continuous operation data streaming device 108 should be connected to power source 110. In a different embodiment, controller 206 may also cause data streaming device 108 to light the LED light 208 that indicates to a user to connect data streaming device 108 to power source 110.

In this way, current limit device 504 provides a warning to a user to connect data streaming device 108 to power source 110 before a brown out condition described in FIGS. 3-4 occurs and data streaming device 108 disables one or more components 212. In another embodiment, controller 206 may also reduce functionality of components 212 that cause a reduction in resolution, slow down the frame rate of the streaming content, turn down Wi-Fi capability, etc., so that data streaming device 108 continues to function.

Figure 6:
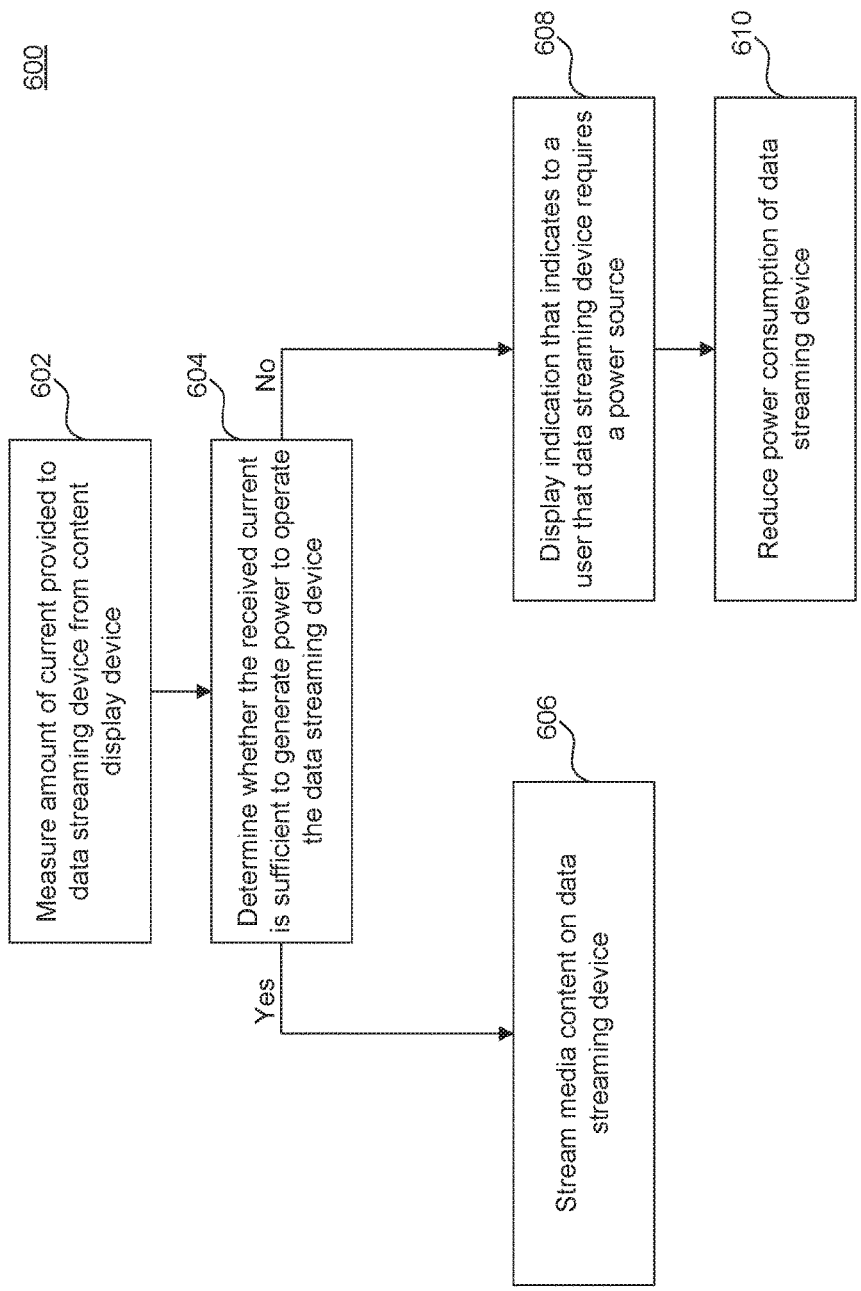
FIG. 6 is a flowchart of a method that determines whether a data streaming device receives sufficient amount of power to operate, according to an embodiment.

FIG. 6 is a flowchart of a method 600 that determines whether a data streaming device receives sufficient amount of power to operate, according to an embodiment. Method 600 may be implemented using processing logic that can comprise hardware (e.g., circuitry, dedicated logic, programmable logic, microcode, etc.), software (e.g., instructions run on a processing device), or a combination thereof.

At operation 602, the current provided to data streaming device is measured. For example, current limit device 504 detects current 502 provided by content display device 104 via USB port. Once detected, current indicator pin 508 indicates the amount of current 502 provided by content display device 104.

At operation 604, a determination is made whether the provided current is sufficient to generate sufficient power for data streaming device. For example, the amount of current required to operate data streaming device 108 may be preconfigured. If current limit device 504 determines that current 502 exceeds the preconfigured current, the flowchart proceeds to operation 606. Otherwise, if current limit device 504 determines that current 502 is less than the preconfigured current, the flowchart proceeds to operation 608.

At operation 606, content is processed. For example, data streaming device 108 processes streaming content received from network 106 and provides the streaming content to content display device 104.

At operation 608, an indication is displayed. For example, data streaming device 108 may indicate via LED light 208 or a message displayed on remote control 114 that data streaming device 108 may have insufficient power and should be connected to power source 110.

At operation 610, data streaming device reduces power consumption. For example, data streaming device 108 may slow down content resolution, decrease frame count etc., until data streaming device 108 is connected with power source 110. In an embodiment, such a reduction of power may allow data streaming device 108 to operate and stream content in a less than optimal mode until data streaming device 108 is connected to power source 110. In an embodiment, operation 608 may occur before or in parallel with operation 610.

Figure 7:
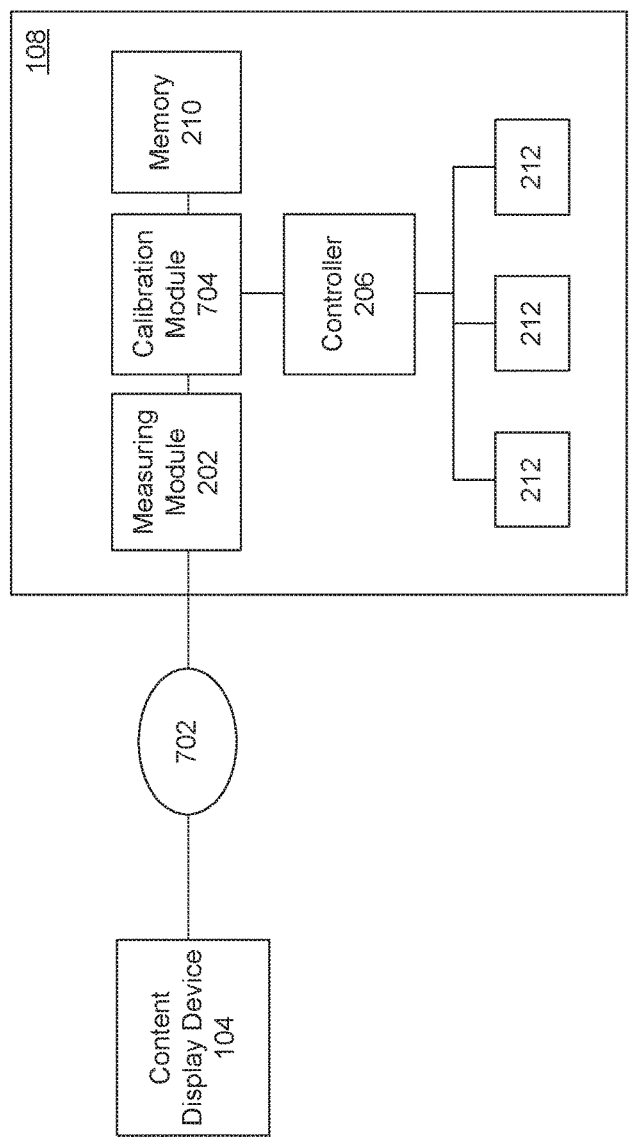
FIG. 7 is a block diagram of a data streaming device that calibrates components to stream content using available power, according to an embodiment.

FIG. 7 is a block diagram 700 of a data streaming device that calibrates components to stream content using available power, according to an embodiment. Data streaming device 108 in block diagram 700 may include some or all components of data streaming device in FIGS. 2, 3, and 5. Data streaming device 108 in block diagram 700 includes a measuring module 202. Measuring module 202 measures power 702 that content display device 104 provides to data streaming device 108. In an embodiment, measuring module 202 may be a current limit device, such as current limit device 502 discussed in FIG. 5.

In an embodiment, data streaming device 108 includes a calibration module 704. Calibration module 704 may operate in conjunction with controller 206 (discussed in FIG. 2) and calibrate components 212 of data streaming device 108 so that components 212 operate using available power 702.

In an embodiment, calibration module 704 may reduce functionality of components 212 in order for components to operate using available power 204 and for data streaming device 108 to continue to operate and stream content. For example, calibration module 704 may cause a network connectivity component to decrease the bandwidth or network speed with network 106. This would cause a slower delivery of content to data streaming device 108 from network 106, but will also allow data streaming device 108 to operate using less power. In another example, calibration module 704 may cause a component associated with content processing to decrease resolution of the content, and process content having less pixels as a result. Although this would decrease resolution of the content, data streaming device 108 would be able to operate using less power. In another example, calibration module 704 may cause component associated with content processing to decrease the frame rate. The decrease frame rate would slow down the transfer of content to content display device 104. But a decrease in frame rate would also allow data streaming device to operate using available power 702.

In an embodiment, calibration module 704 may decrease processing of a single component or multiple components 212 so that data streaming device 108 is able to operate using power 702. Additionally, calibration module 704 may also decrease processing of other components not mentioned above to reduce power consumption of data streaming device 108.

In an embodiment, one or more components 212 may be calibrated to different levels, where each level operates using a preconfigured amount of power. Component 212 may use more power operating at one level than at another level. The identifier for component 212, the level of operation, and the preconfigured amount of power associated with each level may be stored in memory 210. Example levels may be various frame rates, various content resolutions, and various CPU and/or GPU clock speeds. Calibration module 704 may access the level and the associated preconfigured amount of power for each component 212 and calibrate each component 212 so that components 212 are able to operate using power 702.

In an embodiment, calibration module 704 may calibrate components 212 when data streaming device 108 is connected to content display device 104 using USB port and content display device 104 begins to supply power 702 to data streaming device 108. In this way, calibration module 704 calibrates components of data streaming device 108 before data streaming device 108 begins to stream content. Additionally, controller 206 may also generate instructions using LED light 208 or a message to remote control 114 to connect data streaming device 108 to power source 110.

In a further embodiment, calibration module 704 may increase network bandwidth, and resolution and/or frame rate of content when data streaming device 108 is connected to power source 110.

In an embodiment, calibration module 704 allows data streaming device 108 to be calibrated in order to provide content to different content display devices 104. For example, content display device 104 manufactured by different manufactures may provide different amounts of power 702 to data streaming device 108. Calibration module 704 can adjust components 212 of data streaming device 108 to operate using different amounts of power 702 as provided by different content display devices 104.

Figure 8:
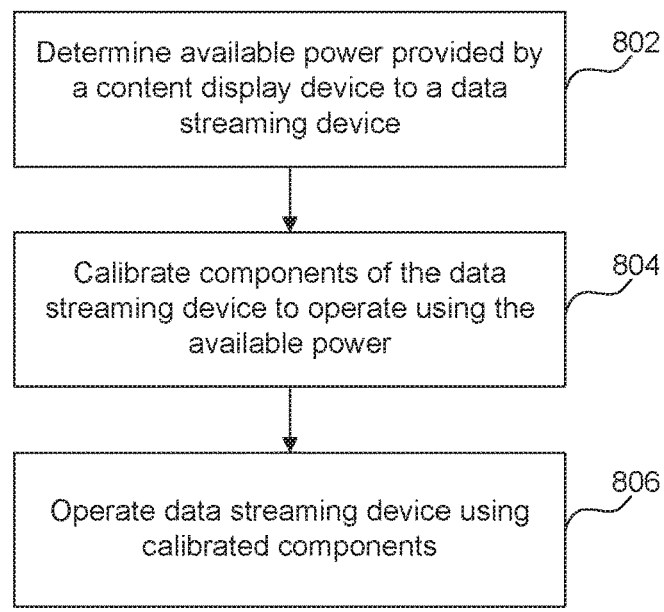
FIG. 8 is a flowchart of a method that calibrates components to stream content using available power, according to an embodiment.

FIG. 8 is a flowchart of a method 800 that calibrates components of data streaming device to operate using available power, according to an embodiment. Method 800 may be implemented using processing logic that can comprise hardware (e.g., circuitry, dedicated logic, programmable logic, microcode, etc.), software (e.g., instructions run on a processing device), or a combination thereof.

At operation 802, available power is determined. For example, measuring module 202 determines power 702 that data streaming device 108 receives from content display device 104 via, for example, a USB cable.

At operation 804, a component of data streaming device is calibrated. For example, calibration module 704 calibrates one or more components 212 so that components 212 are able to operate using available power 702. Example calibration may include decreasing network bandwidth or speed, decreasing content resolution or decreasing frame rate.

At operation 806, a data streaming device is operated. Once one or more components 212 are calibrated, data streaming device 108 operates using calibrated components 212 and power 702.

Figure 9:
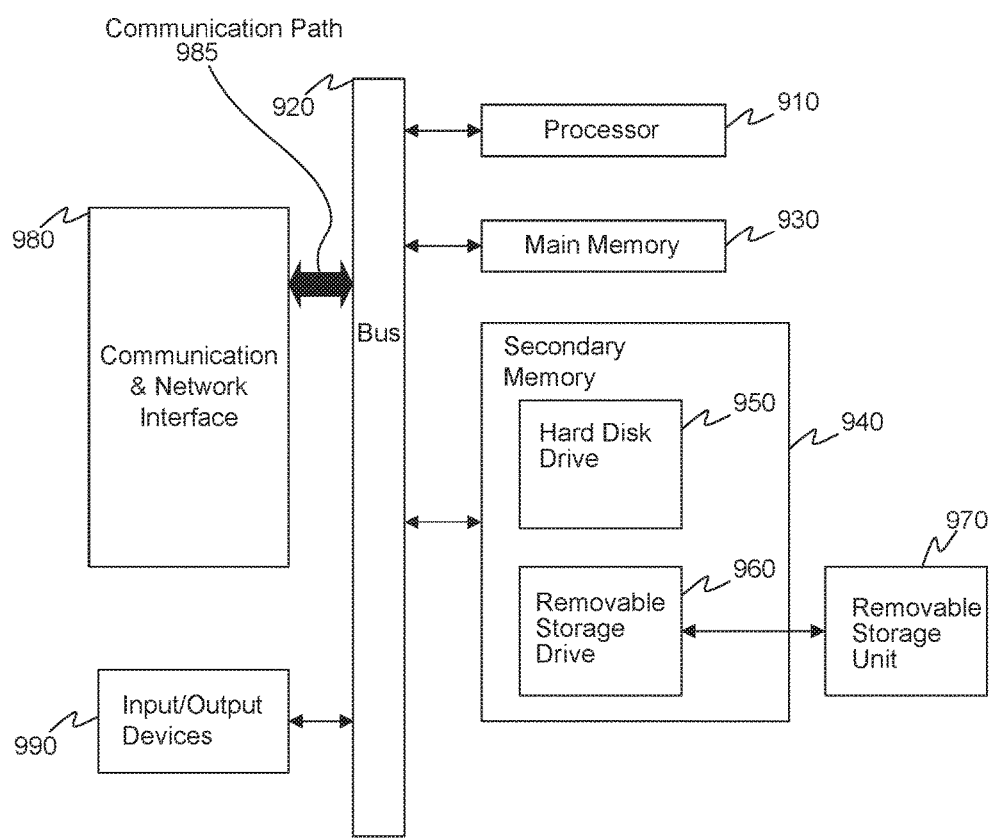
FIG. 9 is an exemplary computer system that can perform the functions described herein, according to an embodiment.

Embodiments shown in FIGS. 1-8, including content sources 102, content display devices 104, data streaming devices 108 and components or subcomponents thereof, can be implemented, for example, using one or more well-known computer systems or one or more components included in computer system 900 shown in FIG. 9. Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/or any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer usable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A data streaming device, comprising:
a plurality of components configured to each provide a functionality to the data streaming device, wherein the plurality of components include a first component and a second component configured to provide a first functionality and a second functionality, different from the first functionality to the data streaming device, respectively;
a plurality of power supplies operatively coupled to the plurality of components and a content display device, wherein the plurality of power supplies include a first power device and a second power device configured to receive from the content display device power to operate the first component and the second component of the data streaming device, respectively, and wherein the plurality of power supplies provide a functionality to the data streaming device that is different from the first component and the second component;
a power regulator operatively coupled to the plurality of power supplies and configured to measure the received power and determine whether the received power is sufficient to operate the plurality of components; and a controller operatively coupled to the power regulator and based at least on a determination that the received power is insufficient to operate at least one of the first component and the second component, wherein the controller is configured to:
identify the first functionality and the second functionality of the first component and the second component respectively,
determine that the first power supply has a higher priority than the second power supply based on the identification of the first functionality and the second functionality of the first component and the second component, respectively,
provide an instruction to the second power supply to decrease an amount of power being provided to the second component based on the determination that the first power supply has a higher priority than the second power supply such that the data streaming device continues to operate with limited power such that the first power supply provides a normal amount of power to the first component and the second power source provides a decreased amount of power to the second component, and
generate an indication that the received power is insufficient to fully power the data streaming device.

2. The data streaming device of claim 1, wherein the controller is further configured to:
determine that the received power provided to at least one of first power supply and the second power supply is below a power threshold required to operate the first component and the second component, respectively, and
determine that at least one of first power supply and the second power supply can operate using the decreased amount of power.

3. The data streaming device of claim 1, wherein the controller is further configured to:
determine that the received power provided to at least one of the first power supply and the second power supply is below a power threshold required to operate the first component and the second component, respectively; and
modify the functionality of the second component based on the determination that the first power supply has a higher priority than the second power supply such that the second component operates with modified functionality using the decreased amount of power.

4. The data streaming device of claim 1, wherein the controller is further configured to:
reduce power consumption of the second component to enable the second component to operate using the decreased amount of power.

5. The data streaming device of claim 1, wherein the second component is associated with providing a network connection to the data streaming device, and the controller is further configured to:
disable the second component.

6. The data streaming device of claim 1, wherein the controller is further configured to:
modify content processing on the data streaming device such that the modified content processing uses the received power.

7. The data streaming device of claim 1, further comprising:
a high definition multimedia interface (HDMI) configured to provide content to the content display device.

8. The data streaming device of claim 1, wherein the controller s further configured to:
activate an indicator to provide the indication.

9. The data streaming device of claim 1, wherein the controller is further configured to:
transmit a message to a remote control associated with the data streaming device, wherein the message indicates that the data streaming device is receiving insufficient power to fully operate the data streaming device.

10. The data streaming device of claim 1, further comprising:
a port operatively coupled to the content display device and configured to:
receive power from at least the content display device,
operatively couple the data streaming device to the content display device, and
provide power to the plurality of power supplies from the content displace device to operate the plurality of components of the data streaming device.

11. A computer implemented method, comprising:
receiving, by a data streaming device operatively coupled to a content display device, power from at least the content display device, wherein the data streaming device comprises a plurality of components configured to each provide a functionality to the data streaming device, and wherein the plurality of components include a first component and a second component configured to provide a first functionality and a second functionality different from the first functionality to the data streaming device, respectively;
receiving, by a plurality of power supplies operatively coupled to the plurality of components and the content display, device, power to operate the plurality of components, wherein the plurality of power supplies include a first power device and a second power device configured to receive from the content display device power to operate the first component and the second component of the data streaming device, respectively, and wherein the plurality of power supplies provide a functionality to the data streaming device that is different from the first component and the second component;
determining that the received power is insufficient to operate at least one of the first component and the second component based at least on a measurement of the received power;
determining that the first power supply and the second power supply are providing power to the first component and the second component, respectively;
identifying the first functionality and the second functionality of the first component and the second component, respectively;
determining that the first power supply has a higher priority than the second power supply based on the identification of the first functionality and the second functionality of the first component and the second component, respectively;
providing an instruction to the second power supply to decrease an amount of power being provided to the second component based on the determination that the first power supply has a higher priority than the second power supply such that the data streaming device continues to operate with limited power such that the first power supply provides a normal amount of power to the first component and the second power source provides a decreased level of power to the second component; and generating an indication that the received power is insufficient to fully power the data streaming device.

12. The method of claim 11, wherein the determining that the received power is insufficient further comprises determining that the received power provided to at least one of the first power supply and the second power supply is below a power threshold required to operate the first component and the second component, respectively, and further comprising:
determining that the second power supply can operate using the decreased amount of power.

13. The method of claim 11, further comprising:
modifying the functionality of the second component based on the determination that the first power supply has a higher priority than the second power supply such that the second component operates with modified functionality using the received power,
wherein the determining that the received power is insufficient further comprises:
determining that the received power provided to the second power supply is below a power threshold required to operate the second component.

14. The method of claim 11, further comprising:
reducing functionality of the second component to enable the second component to operate using the decreased amount of power.

15. The method of claim 11, wherein the second component is associated with providing a network connection to the data streaming device, and further comprising:
disabling the second component.

16. The method of claim 11, further comprising:
modifying content processing on the data streaming device such that the modified content processing uses the received power.

17. The method of claim 11, further comprising:
providing content to the content display device via a high definition multimedia interface operatively coupled to the data streaming device.

18. The method of claim 11, further comprising:
activating an indicator indicating that the data streaming device is receiving insufficient power to fully operate the data streaming device.

19. The method of claim 11, further comprising:
transmitting a message to a remote control associated with the data streaming device, wherein the message indicates that the data streaming device is receiving insufficient power to fully operate the data streaming device, and wherein the generated indication includes the message.

20. A non-transitory computer-readable medium having instructions stored thereon, that, when executed on a computing device, cause the computing device to perform operations, the operations comprising:
receiving, by a data streaming device operatively coupled to a content display device, power from the content display device, wherein the data streaming device comprises a plurality of components configured to each provide a functionality to the data streaming device, and wherein the plurality of components include a first component and a second component configured to provide a first functionality and a second functionality different from the first functionality to the data streaming device, respectively;
receiving, by a plurality of power supplies operatively coupled to the plurality of components and the content display device, power to operate the plurality of components, wherein the plurality of power supplies include a first power device and a second power device configured to receive from the content display device power to operate the first component and the second component of the data streaming device, respectively, and wherein the plurality of power supplies provide a functionality to the data streaming device that is different from the first component and the second component;
determining that the received power is insufficient to operate at least one of the first component and the second component based at least on a measurement of the received power;
determining that the first power supply and the second power supply is providing power to the first component and the second component, respectively;
identifying the first functionality and the second functionality of the first component and the second component, respectively;
determining that the first power supply has a higher priority than the second power supply based on the identification of the first functionality and the second functionality of the first component and the second component, respectively;
providing an instruction to the second power supply to decrease an amount of power being provided to the second component based on the determination that the first power supply has a higher priority than the second power supply such that the data streaming device continues to operate with limited power such that the first power supply provides a normal amount of power to the first component and the second power supply provides a decreased level of power to the second component; and
generating, at the data streaming device, an indication that the received power is insufficient to fully power the data streaming device.

21. The non-transitory computer-readable medium of claim 20, wherein the operations further comprise:
modifying the functionality of the second component based on the determination that the first power supply has a higher priority than the second power supply,
wherein the determining that the received power is insufficient further comprises:
determining that the received power provided to the second power supply is below a power threshold required to operate the second component.

* * * * *

UNITED STATES PATENT AND TRADEMARK OFFICE
CERTIFICATE OF CORRECTION

PATENT NO. : 10,437,304 B2
APPLICATION NO. : 15/070491
DATED : October 8, 2019
INVENTOR(S) : Garner et al.

It is certified that error appears in the above-identified patent and that said Letters Patent is hereby corrected as shown below:

On the Title Page

(75) Inventors section, after "David Stern, Saratoga, CA (US)", insert --Neil Edward Johnson, San Jose, CA (US)--.

In the Claims

Claim 1, Column 14, Line 50, please replace "second functionality, different" with --second functionality different--.

Claim 1, Column 15, Line 7-8, please replace "component respectively" with --component, respectively--.

Claim 8, Column 16, Line 2, please replace "controller s further" with --controller is further--.

Claim 11, Column 16, Line 22, please replace "from at least the" with --from the--.

Claim 11, Column 16, Line 33, please replace "display, device," with --display device,--.

Signed and Sealed this
Twelfth Day of September, 2023

Katherine Kelly Vidal
*Director of the United States Patent and Trademark Office*